United States Patent
Chamberlain, IV

[11] Patent Number: 5,678,102
[45] Date of Patent: Oct. 14, 1997

[54] DUAL PURPOSE CAMERA

[75] Inventor: Frederick R. Chamberlain, IV, Vista, Calif.

[73] Assignee: Eastman Kodak Company, Rochester, N.Y.

[21] Appl. No.: 736,004

[22] Filed: Oct. 23, 1996

[51] Int. Cl.⁶ .............................. G03B 29/00; H04N 1/00
[52] U.S. Cl. .................. 396/429; 396/374; 348/64; 348/96; 358/487
[58] Field of Search ................................ 396/429, 430, 396/374; 358/487, 506, 527; 348/96, 64, 333

[56] References Cited

U.S. PATENT DOCUMENTS

| | | | |
|---|---|---|---|
| 4,841,359 | 6/1989 | Hawkins et al. | 396/429 |
| 5,150,215 | 9/1992 | Shi | 296/429 |
| 5,162,829 | 11/1992 | Lynch et al. | 396/429 |
| 5,272,025 | 12/1993 | Wheeler | 396/429 |
| 5,351,139 | 9/1994 | Miyahara et al. | 358/487 |
| 5,477,353 | 12/1995 | Yamasaki | 358/487 |
| 5,493,353 | 2/1996 | Chen | 396/429 |
| 5,541,644 | 7/1996 | Nanba | 348/96 |
| 5,561,458 | 10/1996 | Cronin et al. | 348/64 |
| 5,570,146 | 10/1996 | Collette | 396/429 |
| 5,606,420 | 2/1997 | Maeda et al. | 396/429 |

*Primary Examiner*—A. A. Mathews
*Attorney, Agent, or Firm*—William F. Noval

[57] ABSTRACT

A dual purpose camera comprising has an optical exposure system for exposing a scene to unexposed film loaded in the camera, thereby producing a latent image in the film, and has an electronic image capture system for producing an electronic image from a developed image on processed film loaded in the camera.

7 Claims, 2 Drawing Sheets

DUAL PURPOSE CAMERA

FIELD OF THE INVENTION

The present invention relates generally to photographic systems and relates more particularly to a dual purpose camera that is capable of capturing images on unexposed film and of producing electronic images from developed images on exposed film.

BACKGROUND OF THE INVENTION

The recent introduction to the photographic market of the Advanced Photo System (APS) has revolutionized the way pictures are taken.

One of the key features of the Advanced Photo System is the return of processed film to the customer inside the original cassette. This feature enables simple loading of the film into devices which electronically scan the silver halide images and output digital images.

At the time of the public announcement of the Advanced Photo System, only two APS digital scanning devices intended for home consumer use were disclosed. Both of these are manufactured by the Fuji Film Co. One of them provides output for display on an analog television, the other provides digital image files to a personal computer. Both of them are stand alone peripheral units. Each is roughly the size of a bread box and each one has a retail price of over $500.00.

A need exists for a simple and portable means for the customer to generate digital images from processed APS film.

SUMMARY OF THE INVENTION

According to the present invention, there is provided a fulfillment of these needs.

According to a feature of the present invention, there is provided a dual purpose camera comprising:

- an optical exposure system for exposing to a scene unexposed film loaded in the camera, thereby to produce a latent image in the film; and
- an electronic image capture system for producing an electronic image from a developed image on exposed film loaded in the camera.

ADVANTAGEOUS EFFECT OF THE INVENTION

The present invention has the following advantages.

1. No separate peripheral required to get digital images from APS negatives.
2. The camera is portable, can scan and display processed images anywhere.
3. Manufacturing cost for hybrid unit will be less than for a separate camera and peripheral scanner, due to leveraging of film transport, optics, etc., within a single unit.
4. Provides increased value to the consumer at a lower cost.

DETAILED DESCRIPTION OF THE INVENTION

Two embodiments are described for providing film scanning capability inside a camera. The first embodiment uses a line scanner, and transports the film in uniform increments or uniform speed past said line scanner, and reads the image a line at a time. The second embodiment uses a two dimensional array scanner and reads in the entire image without moving the film.

Figure 1:
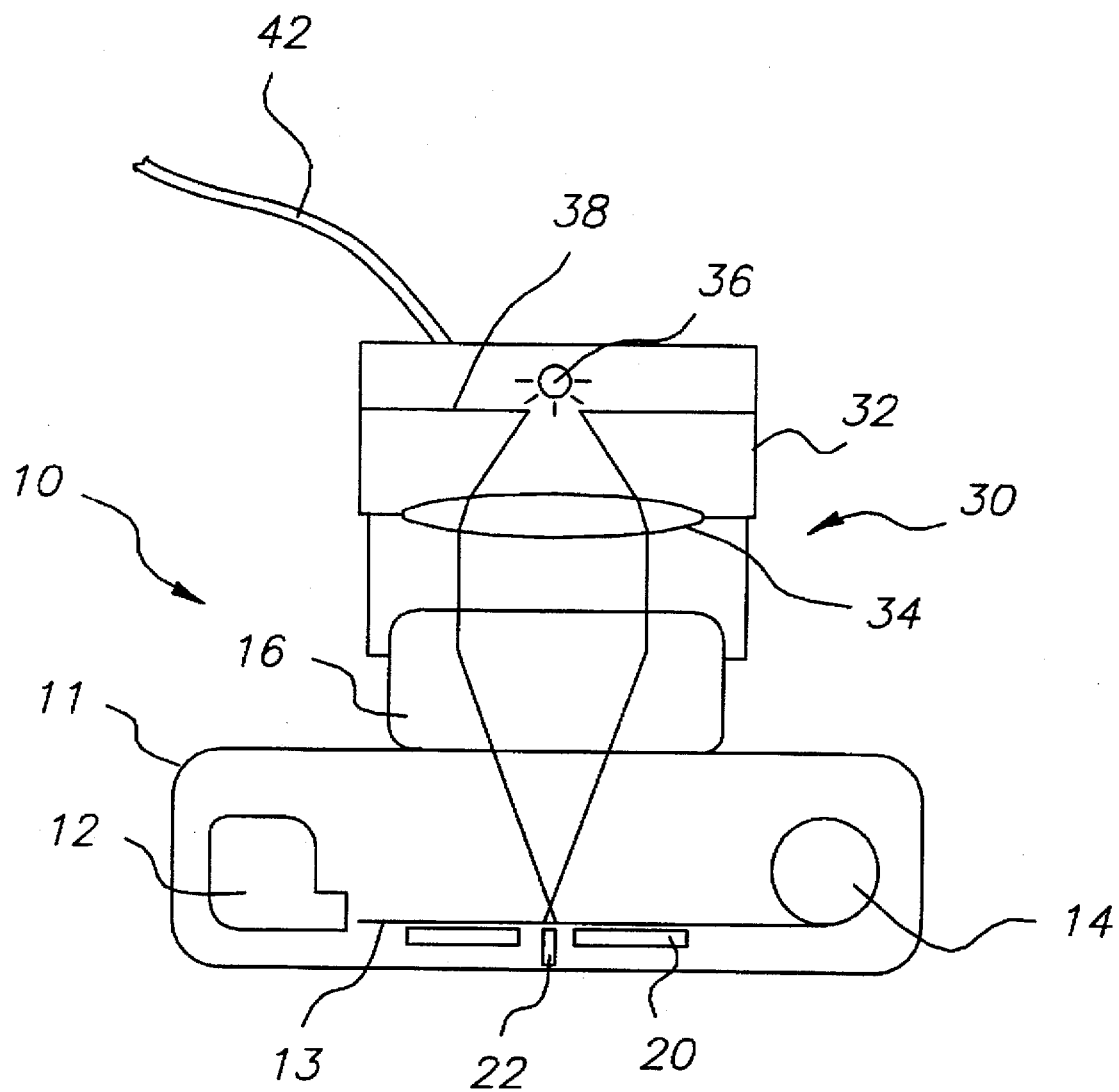
FIG. 1 is a diagrammatic view of one embodiment of the present invention.

FIG. 1 shows a top section view of camera 10 with the first embodiment of the invention. Camera body 11 holds APS cartridge 12. Photographic film 13 is led from said cartridge to take-up spool 14, laying flat across backplane element 20. Line scan element 22 spans the width of the filmstrip, and is used to read in a digital image as the film is advanced through the length of one frame in the standard method of using a line scanner as known in the prior art. Light source accessory 30 mechanically attaches to camera objective lens element 16. Power and data lines are connected from the assembled unit of camera 10 and light source accessory 30 to a personal computer by interface cable 42. Light source 30 is comprised of housing 32, lens element 34, linear light element 36, and aperture 38. Said lens and light element provide a linear strip of illumination on the film above line scan element 22.

Figure 2:
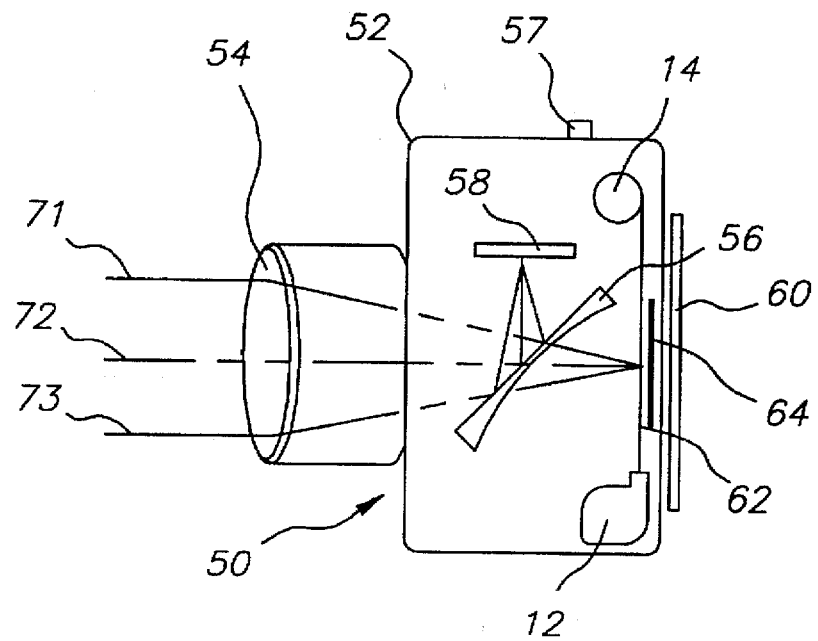
FIGS. 2 and 3 are diagrammatic views of another embodiment of the present invention.

FIG. 2 is a side section of the second embodiment of the invention, a hybrid verifier camera with scanning capability. The optical system shown is very simplistic, but illustrates the features of the invention. In normal operation of camera 50 having camera body 52, light rays, such as 71, 72, and 73, are refracted by objective lens 54, reflected by mirror element 56, and focus onto CCD element 58, which reads the image electronically. The digital image is then displayed on LCD screen 60, which serves as the viewfinder for framing a photograph. When the camera shutter 57 is pressed, mirror element 56 swings up, allowing the light to fall on sensitized film element 62, producing a latent image. The digital image taken just as the shutter button is pressed may be scrutinized, hence "verifying" that the silver halide latent image taken is what the photographer intended.

Figure 3:
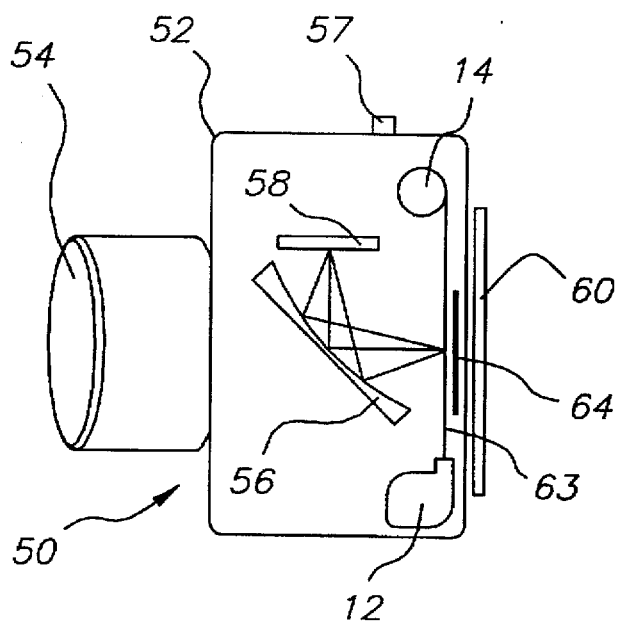

FIG. 3 shows the hybrid camera operating in scanning mode. Mirror element 56 is rotated 90 degrees, and plane light source 64 is illuminated, such that an image of processed film element 63 is focused onto CCD 58. This digital image may then be displayed on LCD screen 60 or output to a television or computer.

The invention has been described in detail with particular reference to a preferred embodiment thereof, but it will be understood that variations and modifications can be effected within the spirit and scope of the invention.

| Parts List | |
| --- | --- |
| 10 | camera |
| 11 | camera body |
| 12 | APS cartridge |
| 13 | photographic film |
| 14 | take-up spool |
| 16 | lens element |
| 20 | backplane element |
| 22 | line scan element |
| 30 | light source accessory |
| 32 | housing |
| 34 | lens element |
| 36 | linear light element |
| 38 | aperture |
| 42 | interface cable |
| 52 | camera body |
| 50 | camera |
| 54 | objective lens |
| 56 | mirror element |
| 57 | camera shutter |

-continued

Parts List

| | |
|---|---|
| 58 | CCD element |
| 60 | LCD screen |
| 62 | sensitized film element |
| 63 | processed film element |
| 64 | plane light source |
| 71,72,73 | light rays |

What is claimed is:

1. A dual purpose camera comprising:
   an optical exposure system for exposing to a scene unexposed film loaded in said camera, thereby to produce a latent image in said film; and
   an electronic image capture system for producing an electronic image from an image on processed film loaded in said camera.

2. The camera of claim 1 wherein said electronic image capture system includes a line scanner which produces said electronic image scan line by scan line as said processed film is advanced in said camera through an image frame.

3. The camera of claim 2 wherein said optical exposure system includes an imaging lens and including an auxiliary light source which can be coupled with said lens to project light into said camera through said processed film to said line scanner.

4. The camera of claim 1 wherein said electronic image capture system includes an area image array scanner which produces said electronic image.

5. The camera of claim 4 including an electronic display mounted on the outside of said camera, and wherein said electronic image capture system is operable when unexposed film is loaded in said camera to produce an electronic image of a scene before, concurrently with, or after said optical exposure system produces a latent image of said scene in said film, said electronic image being displayable on said electronic display.

6. The camera of claim 4 including a light source mounted in said camera to project light through said exposed film to said array scanner.

7. A camera comprising:
   a housing;
   an imaging lens mounted on said housing;
   a film gate positioned within said housing spaced from said lens;
   a planar light source mounted behind said film gate;
   an electronic image capture system mounted in said housing; and
   a mirror system located relative to said lens, said film gate and said electronic capture system, such that when unexposed film is loaded in said camera, said mirror system directs an optical image of a scene projected by said lens onto unexposed film located at said film plane, to said electronic image capture system to produce an electronic image of said scene, and such that when processed film is loaded in said camera, said mirror system directs an optical image, formed by activating said planar light source to project light through an image on processed film located at said film gate, to said electronic capture system to produce an electronic image of said image.

* * * * *